United States Patent
Eickhoff

(10) Patent No.: US 9,640,810 B2
(45) Date of Patent: May 2, 2017

(54) POWER GENERATOR HAVING FUEL CELL AND MEMBRANE CONDUITS

(75) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 950 days.

(21) Appl. No.: 13/167,405

(22) Filed: Jun. 23, 2011

(65) Prior Publication Data
US 2012/0328965 A1    Dec. 27, 2012

(51) Int. Cl.
| | | |
|---|---|---|
| *H01M 8/06* | (2016.01) | |
| *H01M 8/04119* | (2016.01) | |
| *H01M 8/04082* | (2016.01) | |
| *H01M 8/065* | (2016.01) | |
| *H01M 8/241* | (2016.01) | |
| *H01M 8/00* | (2016.01) | |
| H01M 8/2475 | (2016.01) | |
| H01M 8/04291 | (2016.01) | |
| H01M 8/1018 | (2016.01) | |

(52) U.S. Cl.
CPC ....... *H01M 8/04156* (2013.01); *H01M 8/004* (2013.01); *H01M 8/04201* (2013.01); *H01M 8/04216* (2013.01); *H01M 8/065* (2013.01); *H01M 8/241* (2013.01); *H01M 8/04291* (2013.01); *H01M 8/2475* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,973,530 A | | 11/1990 | Vanderborgh |
| 2004/0013927 A1* | | 1/2004 | Lawrence ......... H01M 8/04186 429/492 |
| 2005/0136300 A1* | | 6/2005 | Dyer .............................. 429/19 |
| 2007/0104996 A1* | | 5/2007 | Eickhoff et al. ................ 429/34 |
| 2007/0287052 A1* | | 12/2007 | Brown et al. .................. 429/34 |

(Continued)

FOREIGN PATENT DOCUMENTS

JP    2004-111307 A    4/2004

OTHER PUBLICATIONS

"European Application Serial No. 12172499.1, European Search Report mailed Nov. 26, 2013", 3 pgs.

(Continued)

*Primary Examiner* — Barbara Gilliam
*Assistant Examiner* — Adam A Arciero
(74) *Attorney, Agent, or Firm* — Schwegman Lundberg & Woessner, P.A.

(57) ABSTRACT

A power generator includes a housing, a chemical hydride fuel block adapted to be removably placed within the housing, an air conduit disposed about the chemical hydride fuel block in the housing. The air conduit includes a fuel cell portion and a water vapor permeable, hydrogen impermeable membrane portion. The housing has an air intake opening to draw air into the housing and through the air conduit to provide oxygen to the fuel cell portion and to carry water vapor generated by the fuel cell portion past the permeable membrane portion such that water vapor passes through the membrane and causes release of hydrogen from the fuel block.

12 Claims, 7 Drawing Sheets

(56) References Cited

U.S. PATENT DOCUMENTS

2009/0214904 A1    8/2009  Zhou
2009/0252670 A1*  10/2009  Eickhoff et al. ........... 423/648.1

OTHER PUBLICATIONS

"European Application Serial No. 12172499.1, Examination Notification Art. 94(3) mailed Dec. 12, 2013", 5 pgs.
"European Application Serial No. 12172499.1, Response filed Apr. 16, 2014 to Examination Notification Art. 94(3) mailed Dec. 12, 2013", 17 pgs.
"European Application Serial No. 12172499.1, Communication Pursuant to Article 94(3) EPC mailed Dec. 10, 2015", 4 pgs.
"European Application Serial No. 12172499.1, Response filed Jun. 10, 2016 to Communication Pursuant to Article 94(3) EPC mailed Dec. 10, 2015", 4 pgs.

* cited by examiner

POWER GENERATOR HAVING FUEL CELL AND MEMBRANE CONDUITS

BACKGROUND

Current batteries for portable electronic equipment, such as a hand held mobile devices need to be recharged fairly often. With increasing functionality of such equipment, come increasing power demands. The desired portability of the electronic equipment leads to space constraints, further increasing the demands on battery performance. The energy density of existing batteries is proving insufficient to keep pace with the power requirements of portable electronic equipment.

SUMMARY

A power generator includes a housing, a chemical hydride fuel block adapted to be removably placed within the housing, an air conduit disposed about the chemical hydride fuel block in the housing. The air conduit includes a fuel cell portion and a water vapor permeable, hydrogen impermeable membrane portion. The housing has an air intake opening to draw air into the housing and through the air conduit to provide oxygen to the fuel cell portion and to carry water vapor generated by the fuel cell portion past the permeable membrane portion such that water vapor passes through the membrane and causes release of hydrogen from the fuel block.

In a further embodiment, a power generator includes a housing having an opening to receive gas containing oxygen and water vapor, a fan, and a manifold to distribute air to multiple power generating conduits. Each conduit has a fuel cell portion and a water vapor permeable, hydrogen impermeable membrane portion. The housing is adapted to receive a replaceable chemical hydride fuel block shaped to slide into and out of the casing about the power generating conduits.

A method includes drawing air containing oxygen and water vapor into a housing, distributing the air to a plurality of conduits, flowing the air past a fuel cell portion to provide oxygen to the fuel cell portion and receive water vapor from the fuel cell portion, flowing the air including the received water vapor past a water vapor permeable, hydrogen impermeable membrane portion such that water vapor is transported across the membrane portion to a replaceable chemical hydride fuel block, generating hydrogen in the fuel block responsive to the water vapor, providing the hydrogen to the fuel cell portion, and exhausting air and heat from the conduits out of the housing.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The control functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A high level description of a fuel cell based power generator having components including an air circulating manifold with tubular shaped fuel cells that include water vapor permeable membranes disposed along the tubes, and a block of hydrogen producing fuel is described. Further details regarding the assembly of the components and further details of the tubes is provided along with alternative embodiments.

Many different chemical hydrides may be used for the hydrogen producing fuel, such as for example LiAlH4, LiH, NaAlH4, CaH2, and NaH as well as others in various embodiments. NaAlH4 may provide a good cost/performance balance. Fuel including Li may provide for desireable recycling of spent fuel blocks, which in some embodiments are replaceable in the power generator.

Figure 1:
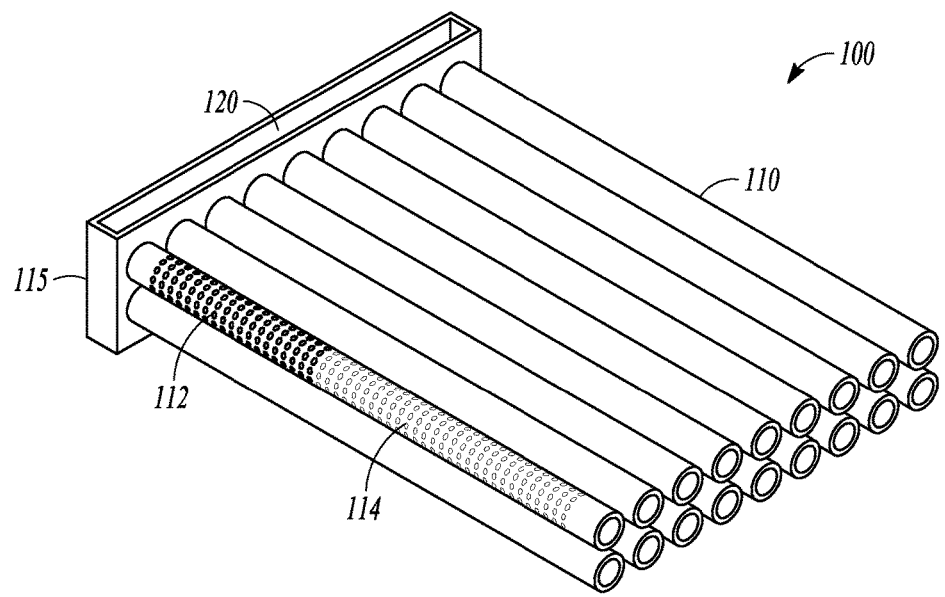
FIG. 1 is a block perspective diagram of an air manifold with air conduits having fuel cell and membrane portions according to an example embodiment.

FIG. 1 is a perspective block diagram of a component of a power generator having an array 100 of tubes or air conduits 110 that contain fuel cells 112 along a part of the length of the tubes 110. The fuel cells 112 may have a metal on polymer film construction for flexibility, thin cross section and low cost. They may be manufactured in a roll to roll type process for efficiency. The tubes 110 also include a portion along their length containing selectively permeable membranes 114. Such as STFE, a Nafion-like polymer for high water vapor to hydrogen/air selectivity. The selectively permeable membranes 114 allow water vapor to pass, but prevent hydrogen from passing. Thinner membranes are desired in one embodiment to enable higher power generation and marginally higher energy density.

In one embodiment, array 100 includes an air manifold 115 to provide oxygen and water vapor containing air to a conduit area inside the tubes 110 containing the fuel cells 112. Air manifold 115 in one embodiment is coupled to the tube 110 at one end of the tubes 110. The tubes 110 open into a manifold cavity 120 of the air manifold 115, allowing air from the manifold cavity 120 to pass into an end of the tubes 110 and travel through the tubes 110 to a far end of the tubes 110, where the air may be exhausted. In one embodiment, the array 100 is fairly flat, and contains two rows of tubes, such that the array may be fit with other components into a cell phone type flat battery.

Figure 2:
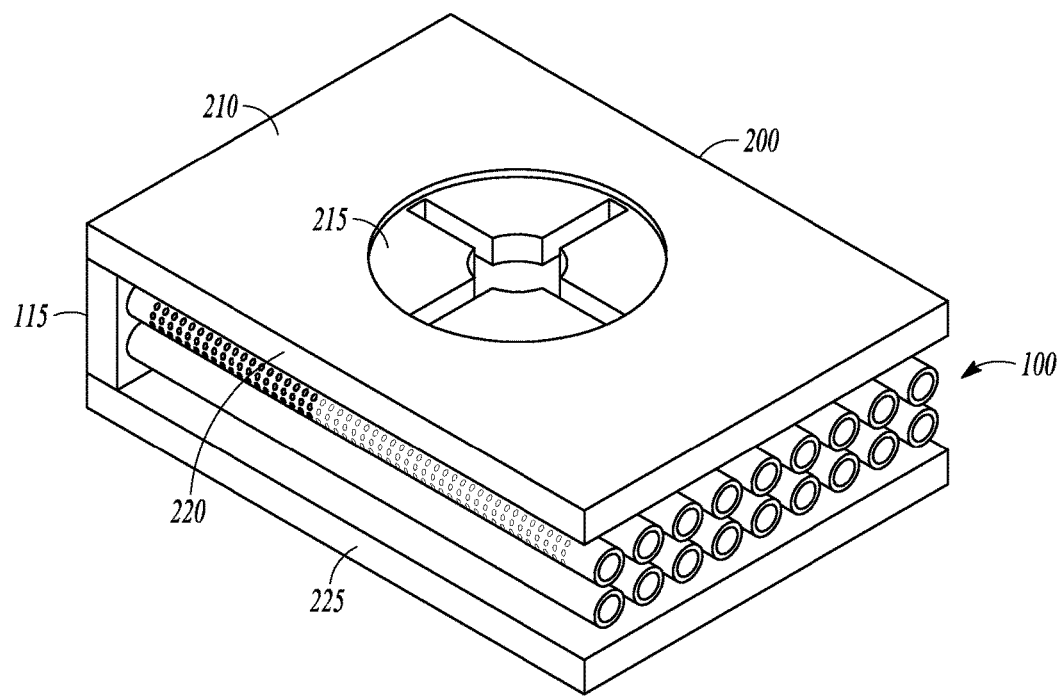
FIG. 2 is a block perspective diagram of a housing to hold the air conduits of FIG. 1 according to an example embodiment.

FIG. 2 illustrates a structure or housing 200 for holding the array 100, and providing air to the manifold 115. A top portion 210 of structure 200 contains a fan 215 and a further manifold 220 that is coupled to manifold 115. The fan 215 in one embodiment is embedded within top portion 210 to provide airflow from ambient, such as air from an environment where the structure 200 is placed. The fan 215 in one embodiment is a low profile, low power fan such as Sunon UB5U3-100 that fits in a 30 mm×30 mm×3 mm form factor, and provides air containing oxygen and water vapor via manifold 220 to manifold 115, resulting in the air flowing through the tubes 110 carrying oxygen and water vapor, as well as heat generated by fuel cell reactions through the tubes, and exhausting the heat and unused air containing oxygen and water vapor to ambient. The structure 200 may also include a bottom portion 225 and sides, not shown, which together with the top portion 210 provide mechanical support for the tubes and manifold 115.

Figure 3:
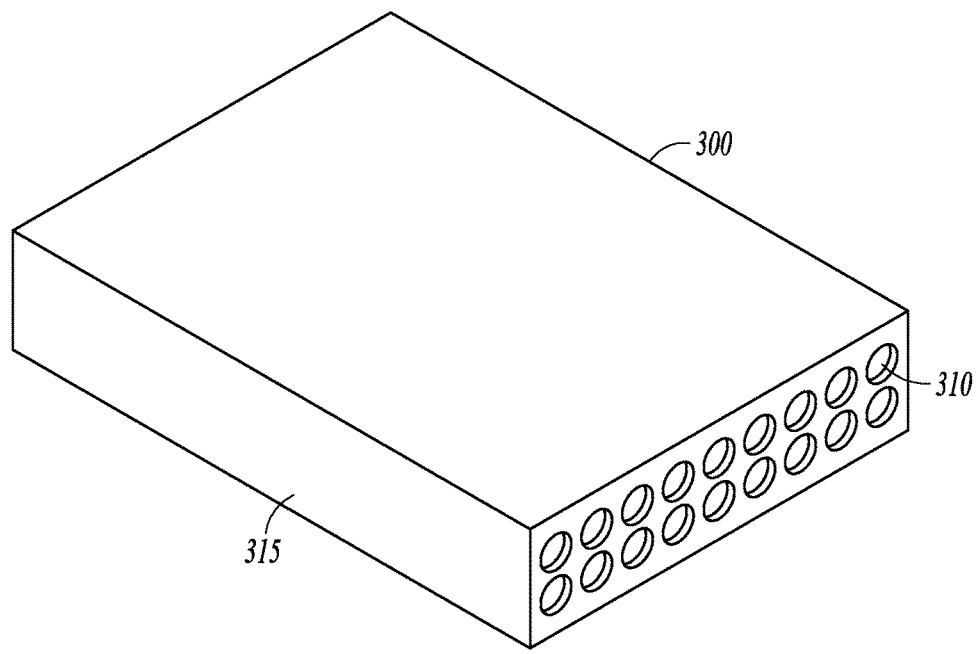
FIG. 3 is a block perspective diagram of a fuel cartridge according to an example embodiment.

A fuel cartridge 300 is illustrated in a perspective block form in FIG. 3. As indicated above, different hydrogen producing materials that produce hydrogen when exposed to water vapor may be used. The fuel cartridge 300 in one embodiment contains cylindrical openings 310 corresponding to the array 100 tubes 110 such that the fuel cartridge 300 may be inserted over the array 100 of tubes 110.

In one embodiment, the fuel cartridge 300 includes a metal or polymer case 315 with integrated gas seals to interface with the tubes 110. The fuel used to form the fuel cartridge 300 may be formed with an engineered particle size, distribution, and controlled density. For example, the fuel may be formed in a hydraulic press with a die, and contain particle sizes in the range of 1 to 100 μm. In one embodiment, the size of the particles may be between 5 to 10 μm. The particles may all be the same size, or may have different ranges of particle sizes within one or more of the above ranges. In one embodiment, particle sizes outside of the above ranges is limited so as to not adversely affect performance of hydrogen generation and utilization of the fuel.

Fuel cartridge 300 may also include a water vapor selective membrane that is impermeable to liquid water, as well as a particulate filter to contain the chemical hydride. The membrane and filter may extend around the outside of the fuel cartridge 300 as well as inside the cylindrical openings 310. The membrane and filter are shown in further detail in succeeding figures.

Figure 4:
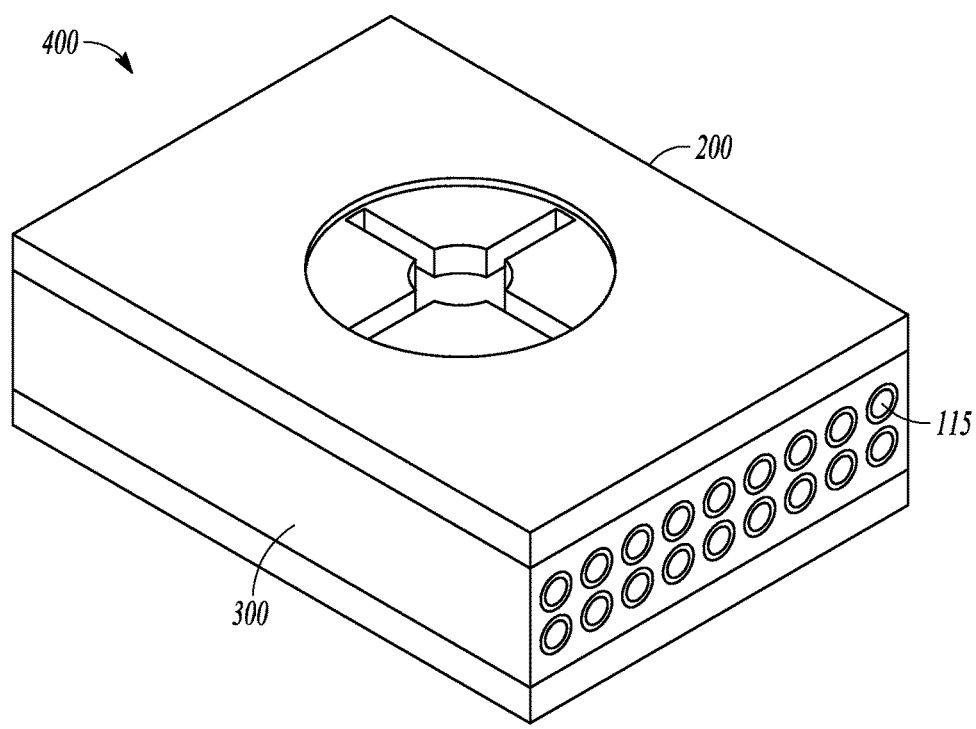
FIG. 4 is a block perspective diagram of a power generator according to an example embodiment.

FIG. 4 illustrates a power generator 400 assembled from the array 100, structure 200, and fuel cartridge 300. In some embodiments, the power generator 400 may have sides and a vented cover to be placed over the openings of the tubes 115 to allow venting to ambient, yet protect the fuel cartridge 300 and tubes 115 from damage. In further embodiments, the metal or polymer case 315 provides this function.

Figure 5:
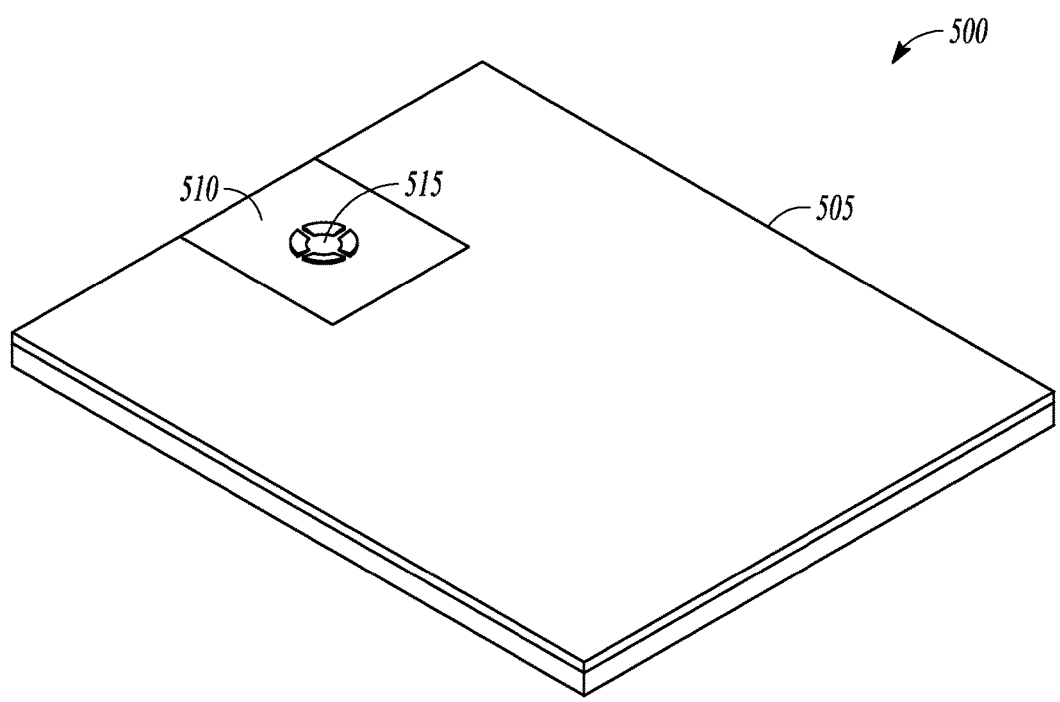
FIG. 5 is a block perspective diagram of an alternative power generator according to an example embodiment.

FIG. 5 is a block perspective diagram of a power generator 500 illustrating a flat, planar type of case or housing 505 construction and having a fan 510 located toward one edge of the power generator 500 in a housing opening 515. The fan location provides for a shorter top portion manifold 220 to connect to the array manifold 115, providing a shorter overall and more efficient ambient air path to the tubes. In one example embodiment, the power generator 500 has a form factor of approximately 10 cm by 10 cm by 6 cm, providing a 60 cc system volume. The fuel cartridge is replaceable in one embodiment. Other shapes and system volumes may be made in further embodiments.

Figure 6:
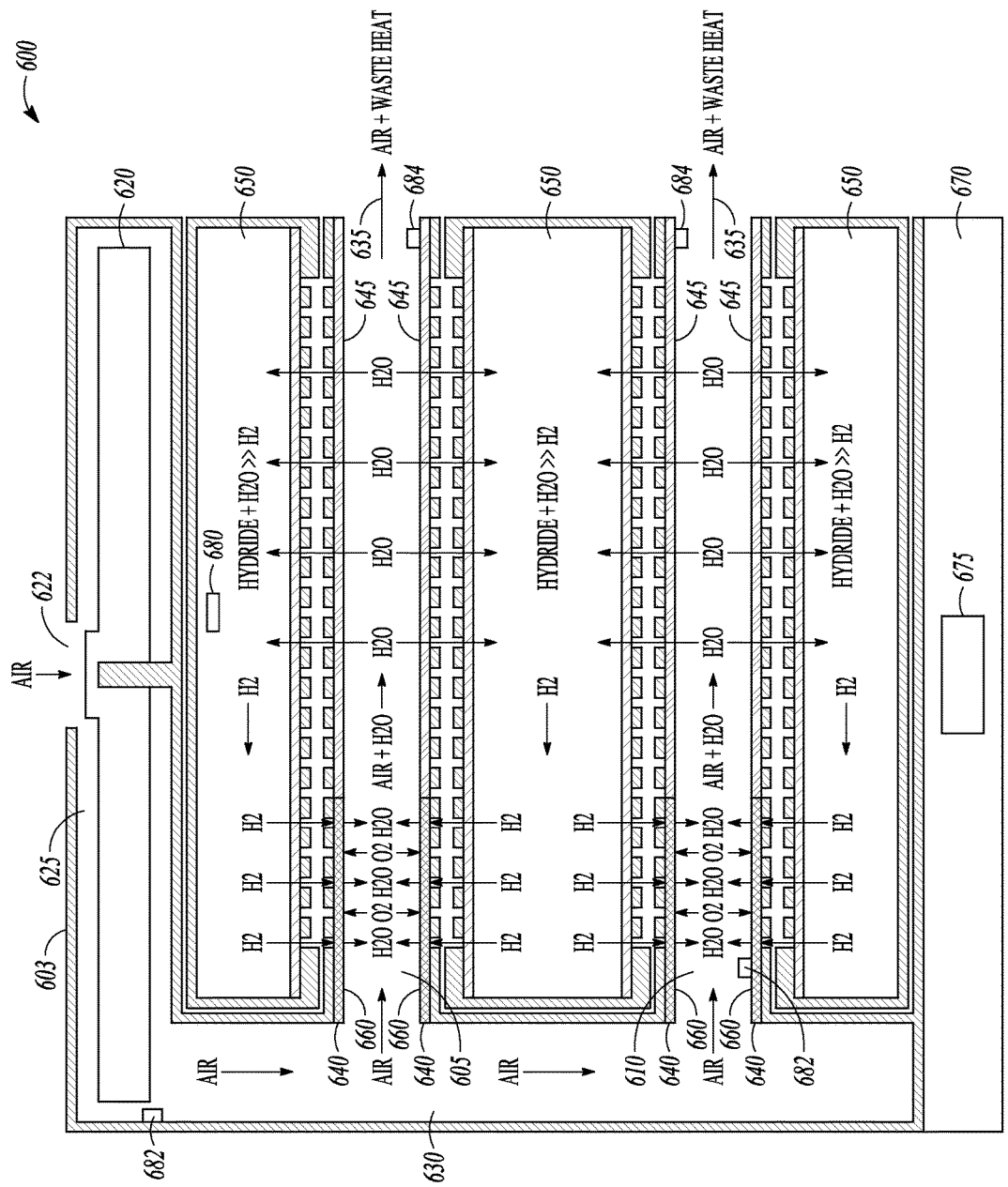
FIG. 6 is a longitudinal cross section of a power generator according to an example embodiment.

FIG. 6 is a longitudinal cross section block representation of power generator 600 having a case or housing 603, taken along two tubes 605 and 610 in an array of tubes. Several arrows illustrated the movement of air, water vapor ($H_2O$), oxygen ($O_2$) and hydrogen ($H_2$) within the power generator 600. A fan 620 draws in air from ambient via an opening 622 in the housing 603, through a fan manifold 625, and an array manifold 630, where the air then flows through the tubes 605 and 610. The air is then exhausted out the tubes as indicated at 635. In one embodiment, a first portion of the tubes contains tubular fuel cells 640, and a second portion of the tubes contains the selectively permeable membranes 645. The selectively permeable membranes 645 allow water vapor to enter a hydrogen producing fuel cartridge 650, which may be encapsulted in a particulate filter 650. The selectively permeable membranes 645 prevent hydrogen from traversing back through the membranes 645. Hydrogen generated in the fuel cartridge is consumed at anodes 655 of the fuel cells, while oxygen in the ambient airflow is consumed at cathodes 660 of the fuel cells. The fuel cells produce water vapor and heat when reacting the hydrogen and oxygen, as well as electricity. The water vapor and heat are carried downstream by the ambient airflow driven by fan 620. Some of the water vapor may proceed back to the fuel cartridge for use in generating more hydrogen, which the heat and excess water vapor is exhausted to ambient.

A controller 670 is disposed within the power generator 600 in one embodiment to control or modulate the fan 620 speed as a function of power demand and power generation of power generator 600. The controller 670 may include a rechargeable battery 675 or other energy storage device such as a super capacitor, which may be charged with the electrical energy generated by power generator 600. The controller 670 is show in one position in the power generator 600, but may be located just about anywhere that does not interfere with assembly and operation of the power generating components of the power generator and allow electrical coupling to the fuel cells and fan.

In one embodiment, controller 670 implements a table lookup mechanism to correlate fan speed with power demand and power generation. The control table may be empirically generated through testing of the power generator in one embodiment. Some factors that may be considered when developing a control algorithm include the efficiency of the power generator at various temperatures. Faster fan speed may exhaust more heat, providing a cooling effect on the power generator, while also providing more water vapor from which hydrogen may be generated and converted to electricity.

In one embodiment, one or more pressure sensors may be disposed within the fuel cartridge as indicated at 680. Further, temperature and relative humidity sensors are disposed at one or more locations within the power generator, such as at the beginning upstream portion of the tubes as indicated at 682 and exhaust end of the tubes 684. Temperature and humidity sensors 682 may also be positioned near the housing opening or manifold 625 in further embodiments. Information from the various sensors may be provided to the controller to aid in modulating the fan 620 speed.

While power generator 600 is shown as having fuel cells positioned only at the beginning of the tubes next to the manifold 630, in further embodiments, additional fuel cells may be interspersed with portions of the tubes having selectively permeable membranes. This may provide for a more efficient flow and use of hydrogen generated by the fuel cartridge. In some embodiments, the total fuel cell length is about $\frac{1}{3}^{rd}$ of the length of the tube, with the remainder of the tube containing selectively permeable membrane. In further embodiments, the lengths may be varied depending on the desired power generation characteristics, and may not include the entire length of the tubes in either fuel cell or selectively permeable membrane.

Figure 7:
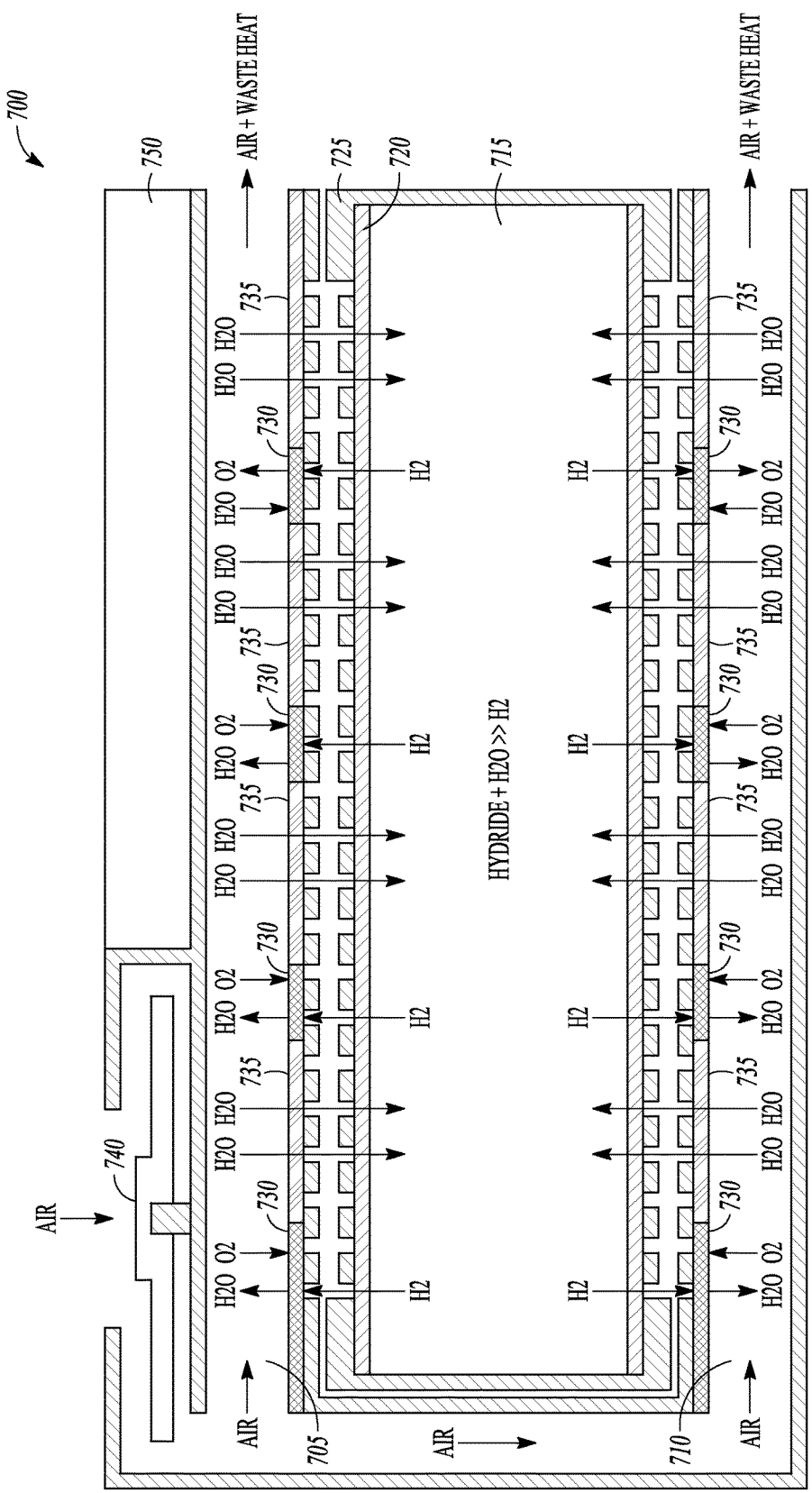
FIG. 7 is a longitudinal cross section of an alternative power generator according to an example embodiment.

FIG. 7 is a longitudinal cross section block representation of a power generator 700 illustrating planar air flow paths or conduits 705, 710 on either side of a hydrogen generating fuel 715. Fuel 715 includes an encapsulating particulate filter 720, and a container or shell 725. The shell 725 in one embodiment is formed of a rigid metal or polymer material that allows handling of the fuel 715.

On both sides the fuel 715, the air flow paths 705 and 710 contain multiple lengths or portions of fuel cells 730 interspersed with lengths or portions of selectively permeable membranes 735. The fuel cells and membranes function in the same way as in power generator 600. In some embodiments, since the paths are planar, the fuel cells and membranes may be formed in strips extending the entire width of the fuel 715, or may even be formed in different patterns, such as checkerboard or other patterns to aid in utilization of all the fuel 715 by providing shorter water vapor and hydrogen migration paths within the fuel 715, as well as insuring that generated water vapor is effectively utilized. While in FIG. 7 several of alternating strips are illustrated, in further embodiments, even narrower strips and more sets of strips are desired to further promote effective utilization of the generated water vapor and utilization of the fuel.

In power generator 715, a fan 740 provides ambient air flow to the airflow paths via one or more manifolds. In further embodiments, the air may be provided by a source separate from the power generator 700, such as by an external fan or pressurized source of air having a desired humidity level. Control electronics and battery 750 may be located next to the fan 740, and modulate the fan as a function of temperature, pressure, and power demand. The fan may be powered from the batter in various embodiments.

Figure 8:
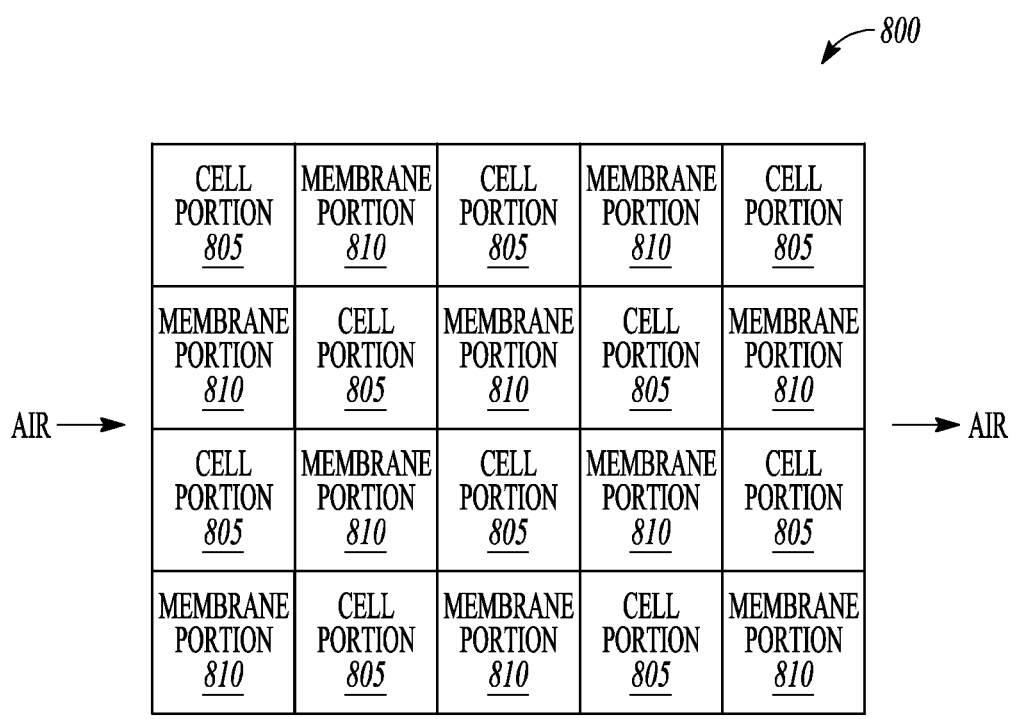
FIG. 8 is a top view representation of a conduit illustrating fuel cell portions and selectively permeable membrane portions according to an example embodiment.

FIG. 8 is a top view representation of a conduit 800 illustrating fuel cell portions 805 and selectively permeable membrane portions 810 according to an example embodiment. In one embodiment, the portions may resemble a checkerboard square, with alternately disposed fuel cell portions adjacent membrane portions. In further embodiments, longitudinal or transverse stripes of portions may be used. Many different layouts of the portions may be used in various embodiments, while retaining a desired ratio of areas of the fuel cell portions to selectively permeable membrane portions and effective utilization of the water vapor and fuel.

Figure 9:
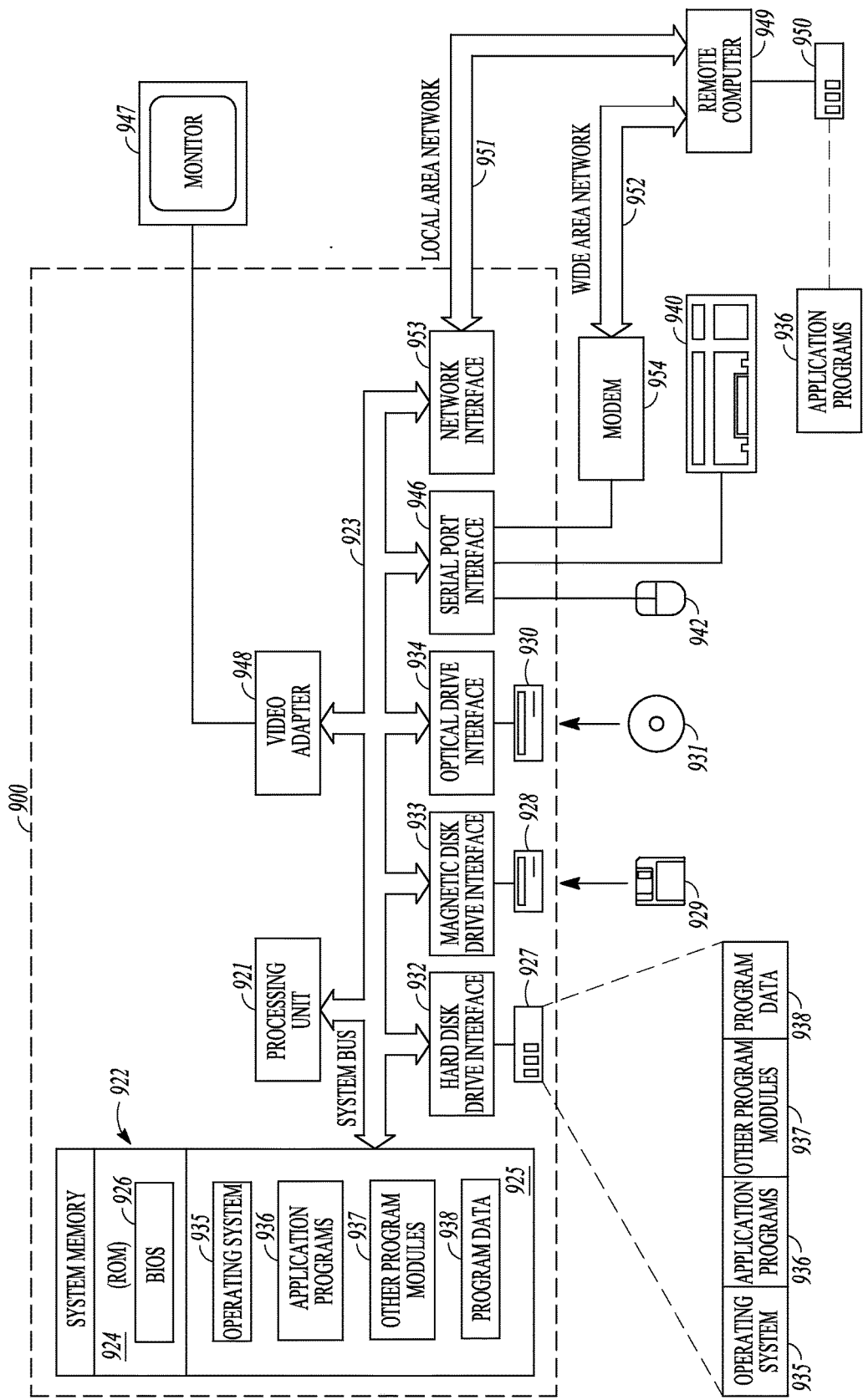
FIG. 9 is a block diagram representation of an example controller to execute methods and algorithms according to an example embodiment.

FIG. 9 is a block diagram representation of an example controller to execute methods and algorithms according to an example embodiment. In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; other types of communication devices may also be used. The remote computer 949 can be another computer, a server, a router, a network PC, a client, a peer device or other common network node, and typically includes many or all of the elements described above 110 relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A power generator comprising:
a housing;
a chemical hydride fuel block, the chemical hydride fuel block including an array of cylindrical openings passing through the entire length of the chemical hydride fuel block, the chemical hydride fuel block shaped to be removably slid within the housing, the chemical hydride fuel block including a chemical hydride to produce hydrogen when exposed to water vapor; and
an air conduit disposed about the chemical hydride fuel block in the housing, the air conduit including an array of air conduit tubes, the chemical hydride fuel block being adapted to be removable from the housing and the array of air conduit tubes, the array of air conduit tubes shaped to slide within the array of cylindrical openings to expose the outer surface of the array of air conduit tubes to the inner surface of the array of cylindrical openings when the chemical hydride fuel block is within the housing, wherein each of the air conduit tubes comprises:
a fuel cell portion; and
a water vapor permeable, hydrogen impermeable membrane portion adapted to allow water vapor to pass through to cause release of hydrogen from the fuel block;
an exhaust opening shaped to facilitate installing and removing the fuel block and exhaust air drawn past the fuel cell portion and the membrane portion through each of the fuel block tubes to ambient;
wherein the housing includes an air intake opening to draw air containing oxygen and water vapor into the housing and through the array of air conduit tubes and through an installed chemical hydride fuel block to provide oxygen to the fuel cell portion and to receive water vapor generated by the fuel cell portion, and to flow the air including the received water vapor past the permeable membrane portion of each of the air conduit tubes and to transport water vapor across the membrane portion to the replaceable chemical hydride fuel block.

2. The power generator of claim 1 and further comprising a fan positioned in the housing air intake opening to draw air into the air conduit from ambient.

3. The power generator of claim 2 and further comprising a controller to control the fan.

4. The power generator of claim 3 and further comprising sensors positioned in the housing to provide pressure, temperature, and relative humidity information to the controller.

5. The power generator of claim 1 wherein the fuel cell comprises a cathode exposed to the air in the air conduit, and an anode exposed to hydrogen generated by the fuel block.

6. The power generator of claim 1 wherein the fuel cell portion and water vapor permeable, hydrogen impermeable membrane portion comprise alternating stripes of fuel cells and membranes.

7. The power generator of claim 1 wherein the housing further comprises a manifold to distribute air to the array of air conduit tube fuel cell portions and membrane portions, the array of conduit tubes extending through the fuel block in the form of multiple cylinders.

8. The power generator of claim 7 wherein the array of cylindrical openings are shaped to correspond to multiple cylinders.

9. The power generator of claim 1 wherein the chemical hydride comprises a pressed block of chemical hydride having a particle size of between 1 to 100 μm.

10. The power generator of claim 1 wherein a fuel cell area covers ⅓rd of the air conduit area and the membrane area covers about ⅔rds of the air conduit area.

11. The power generator of claim 1 wherein the shape of the air conduit tubes substantially match the shape of the cylindrical openings to provide contact between the air conduit tubes and the cylindrical openings.

12. The power generator of claim 11 wherein the air conduit tubes and the cylindrical openings are cylindrical in shape.

* * * * *